(12) United States Patent
Iwabuchi et al.

(10) Patent No.: US 6,441,389 B1
(45) Date of Patent: Aug. 27, 2002

(54) PROCESS FOR REPRODUCING RADIATION IMAGE USING STIMULABLE PHOSPHOR SHEET HAVING ONE-DIMENSIONALLY EXTENDED PARTITIONS

(75) Inventors: Yasuo Iwabuchi; Satoshi Arakawa, both of Kanagawa (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/496,285

(22) Filed: Feb. 1, 2000

(30) Foreign Application Priority Data

Feb. 1, 1999 (JP) .......................................... 11-024396

(51) Int. Cl.[7] .................................................. A61B 6/00
(52) U.S. Cl. ..................................... 250/581; 250/327.2
(58) Field of Search .............................. 250/581, 327.2, 250/484.4, 580, 483.1; 427/64

(56) References Cited

U.S. PATENT DOCUMENTS 6,252,243 B1 * 6/2001 Isoda et al. ................. 250/581

* cited by examiner

*Primary Examiner*—Hung Xuan Dang
(74) *Attorney, Agent, or Firm*—Sughrue Mion, PLLC

(57) ABSTRACT

A stimulable phosphor sheet having one-dimensionally extended partitions comprising stimulating ray-reflecting material and dividing a plane of the phosphor sheet to give plural narrow sections, and a stimulable phosphor placed separately in the narrow sections is favorably employed in a radiation image reproducing method by scanning stimulating rays in a direction of crossing the partitions.

7 Claims, 4 Drawing Sheets

FIG.2
(1)
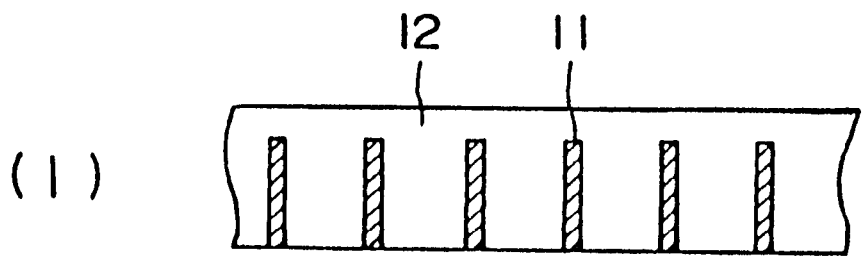
(2)
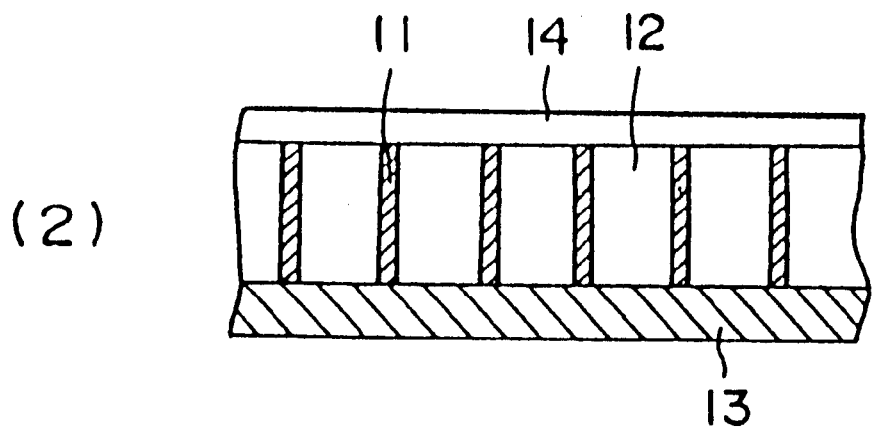

PROCESS FOR REPRODUCING RADIATION IMAGE USING STIMULABLE PHOSPHOR SHEET HAVING ONE-DIMENSIONALLY EXTENDED PARTITIONS

FIELD OF THE INVENTION

The present invention relates to a process for re-producing a radiation image using a stimulable phosphor sheet. The process is favorably employable in a radiation image recording and reproducing method which-utilizes stimulated emission produced from a stimulable phosphor.

BACKGROUND OF THE INVENTION

As a method replacing a conventional radiography using a combination of a radiographic film and radio-graphic intensifying screen, a radiation image recording and reproducing method utilizing a stimulable phosphor is practically employed. The method employs a stimulable phosphor sheet (i.e., radiation image storage panel) comprising a stimulable phosphor, and comprises the steps of causing the stimulable phosphor to absorb radiation energy having passed through an object or having radiated from an object; sequentially exciting the stimulable phosphor with an electromagnetic wave such as visible light or infrared rays (hereinafter referred to as "stimulating rays") to release the radiation energy stored in the phosphor as light emission (i.e., stimulated emission); photoelectrically detecting the emitted light to obtain electric signals; and reproducing the radiation image of the object as a visible image from the electric signals. The sheet thus processed is subjected to a step for erasing a radiation image remaining therein, and then stored for the next radiation image recording and reproducing procedure. Thus, the stimulable phosphor sheet can be repeatedly employed.

In general, a support and a protective film are provided on the top and bottom surfaces of the stimulable phosphor sheet, respectively. The stimulable phosphor sheet usually comprises a binder and stimulable phosphor particles dispersed therein, but it may consist of agglomerated phosphor without binder. The phosphor sheet containing no binder can be formed by:deposition process or firing process. further, the phosphor sheet comprising agglomerated phosphor soaked with a polymer is also known.

For reproducing a radiation image stored in the stimulable phosphor sheet in the form of a latent image, two processes are known. One comprises the steps of sequentially scanning the stimulating rays in such manner that the plane of the sheet may be divided into pixels, and detecting the stimulated emission with a photodetector (such as a photomultiplier tube or a photoconductive device) having am wide light-receiving surface. In this method, the pixels are formed via time series excitation. In the other process, the stimulated emission is detected with a photodetector (such as a two-dimensional solid image pickup, device or a semiconductor line sensor) to divide the plane of the sheet into pixels, and time series signals of the radiation image information are obtained by an electric circuit. The former process has some disadvantageous features. For example, a large, complex system is needed. Further, in the former process, it takes a relatively long time to perform the process.

The radiation image recording and reproducing method is often used as X-ray radiography for medical diagnosis. In that case, it is especially desired to obtain a radiation image of high quality (particularly, high sharpness for high resolution) by applying a small dose of radiation. Therefore, the stimulable phosphor sheet is required to have a high sensitivity and to provide an image of high quality.

The sharpness of radiation image is mainly affected by diffusion or scattering of the stimulating ray in the phosphor sheet in the case that the reading process is performed by the steps of sequentially scanning the stimulating rays to divide the plane of the sheet into pixels, and detecting the stimulated emission by a photo-detector having a wide light-receiving surface. In this process, the procedure for reading the latent image comprises the steps of sequentially and sweepingly applying a beam of the stimulating rays onto the surface of the sheet to induce the stimulated emission, and successively collecting and detecting the emission. If the stimulating ray diffuses or scatters (horizontally in particular) in the sheet, it excites the stimulable phosphor not only at the target spot but also in its periphery. Consequently, the stimulated emission emitted from the target position is detected together with that from the periphery. This contamination of the emissions impairs the sharpness of the resultant image. On the other hand, in the case that the pixels are formed with a photodetector such as two-dimensional solid image pickup device or semiconductor line sensor, the sharpness of radiation image is mainly affected by diffusion or scattering of the stimulated emission.

For avoiding the diffusion or scattering of the stimulating ray, it was proposed to divide a plane of the stimulable phosphor sheet (or a phosphor layer in the radiation image storage panel) into small sections (cells) with a partition reflecting the stimulating rays.

Japanese Patent Provisional Publication No. 59-202100 discloses a radiation image storage panel having a honey-comb structure consisting of many small cells filled with stimulable phosphor. The panel comprises a substrate and a stimulable phosphor layer provided thereon, and the honey-comb structure sectioned with a partition is further provided on the phosphor layer.

Japanese Patent Provisional Publication No. 62-36599 discloses a storage panel employing a support provided with many hollows regularly arranged on one surface. The hollows are filled with stimulable phosphor, and the ratio of depth to diameter of each hollow is 3.5 or more.

Japanese Patent Provisional Publication No. 5(1993)-512636 discloses a process for preparing pixel phosphor with a mold.

Japanese Patent Provisional Publication No. 2-129600 proposes a storage panel employing a support plate having many holes vertically bored and filled with stimulable phosphor.

Further, Japanese Patent Provisional Publication No. 2-280100 discloses a stimulable phosphor sheet employing a substrate having a honey-comb micro-structure filled with stimulable phosphor.

In our copending U.S. Ser. No. 09/267,645 (filed Mar. 15, 1999, a stimulable phosphor sheet comprising stimulable phosphor-containing partitions which divide the phosphor sheet to give small sections in which a stimuable phosphor is placed is described. On the interface between the partition and the stimulable phosphor-contained section, the stimulating rays are reflected.

In our copending U.S. Ser. No. 09/397,926, a stimulable phosphor sheet comprising UV light or visible light emitting phosphor-containing partitions which divide the phosphor sheet to give small sections in which a stimulable phosphor is placed is described. On the interface between the partition and the stimulable phosphor-contained section, the stimulating rays are reflected.

An object of the present invention is to provide a process for reproducing a radiation image from a stimulable phosphor sheet in which the radiation image is stored in the form of a latent image, so that a radiation image having high sharpness can be easily obtained.

Another object of the invention is to provide a stimulable phosphor sheet appropriately employable for the radiation image reproducing process of the invention.

SUMMARY OF THE INVENTION

The present invention resides in a process for reproducing a radiation image, which comprises the steps of:

scanning stimulating rays on a stimulable phosphor sheet in which a radiation image is recorded in the form of a latent image, the phosphor sheet comprising one-dimensionally extended partitions which comprise stimulating ray-reflecting material and which divide a plane of the phosphor sheet to give plural narrow sections, and a stimulable phosphor placed separately in the narrow sections, in such manner that the stimulating rays are scanned in a direction crossing the partitions, so that the stimulable phosphor produces emission;

successively detecting photoelectrically the emission, so as to obtain a series of electric signals corresponding to the latent radiation image; and reproducing the radiation image from the electric signals.

The invention also resides in the stimulable phosphor sheet of the above-mentioned composition which is used in the radiation image recording and reproducing method comprising the steps of recording a radiographic image on the sheet as a latent image, irradiating the latent image with stimulating rays to release stimulated emission, and electrically processing the emission to reproduce the radiation image.

The scanning is preferably done using a laser beam as the stimulating rays and in a direction at an angle of 90°±45° to the direction parallel to the partitions.

In performing the radiation image-reproducing process of the invention, the stimulating rays are preferably scanned, while the stimulable phosphor sheet is moved in a direction approximately parallel to the partitions.

The stimulable phosphor sheet of the invention comprises one-dimensionally extended partitions made of stimulating ray-reflecting material, and stimulable phosphor-charged areas sectioned with the partitions. The stimulating rays are scanned on the sheet in a direction crossing the partitions so that the pixel may be assigned. Accordingly, the radiation image reading process can be easily performed, and further the stimulating rays are kept from diffusing or scattering by the partitions. By the process of the invention, a radiation image is reproduced from the stimulable phosphor sheet with high sharpness.

BRIEF DESCRIPTION OF DRAWINGS

FIG. 2 (1) show a sectional vie of another embodiment of the invention, and

FIG. 2 (2) is a sectional view of the sheet of (1) provided with a protective film and a support on the top and the bottom surfaces, respectively.

DETAILED DESCRIPTION OF THE INVENTION

The stimulable phosphor sheet of the invention is characterized by comprising one-dimensionally extended partitions and areas sectioned with the partitions. The partitions are made of stimulating ray-reflecting material, and one-dimensionally divide the plane of the sheet to give narrow sections in which the stimulable phosphor is charged. Since the stimulating ray-reflecting partitions prevent the stimulating ray from diffusing or scattering, the sheet of the invention can reproduce a radiation image with high sharpness. Further, the stimulable phosphor sheet having the one-dimensionally extended partitions can be more easily produced than the known stimulable phosphor sheet having honey-comb structure.

From the viewpoint of fundamental performance, it is not necessary for the phosphor sheet of the invention to have a transparent protective film and a support. The stimulable phosphor sheet, however, is preferably provided with the protective film and the support, for ensuring easy handling in transportation and for avoiding deterioration, and hence a typical embodiment of the phosphor sheet comprises a support and a protective film provided on the bottom and on the top surface, respectively. By taking an example of the phosphor sheet having that structure, the invention is described below.

As the support, a sheet or a film of flexible resin material having a thickness of 50 μm to 1 mm is usually employed. The support may be transparent or may contain light-reflecting material (e.g., titanium dioxide particles, barium sulfate particles) or voids for reflecting the stimulating rays or the stimulated emission. Further, it may contain light-absorbing material (e.g., carbon black) for absorbing the stimulating ray or the stimulated emission. Examples of the resin material include polyethylene terephthalate, polyethylene naph-thalate, aramid resin and polyimide resin. The support may be a sheet of other material such as metal, ceramics and glass, if needed. On the phosphor sheet-side surface of the support, auxiliary layers (e.g., light-reflecting layer, light-absorbing layer, adhesive layer, electro-conductive layer) or many hollows may be provided. On the other side surface, a friction-reducing layer or an anti-scratch layer may be formed.

The stimulable phosphor layer or sheet is provided on the support. The-phosphor sheet according to the invention comprises one-dimensionally extended partitions which are made of stimulating ray-reflecting material and which divide the plane of the phosphor sheet to give narrow sections, and stimulable phosphor-charged areas sectioned with the stimulating ray-reflecting partitions. By referring to the attached drawings, the constitution of the stimulable phosphor sheet is described below.

Figure 1:
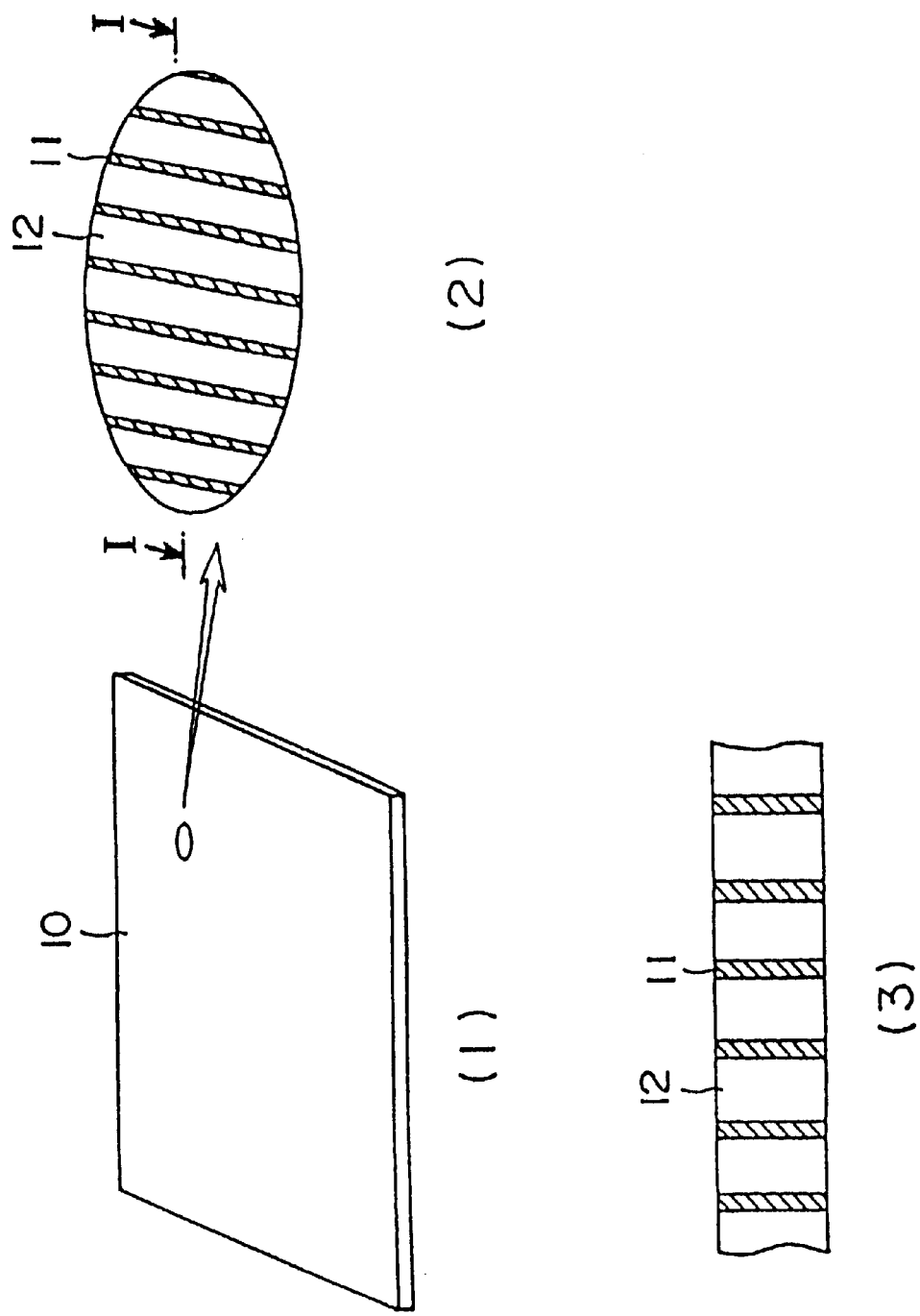
FIGS. 1 (1), (2) and (3) are a sketch showing a stimulable phosphor sheet of the invention, a partial enlarged drawing of (1) and a partial sectional view of (2) sectioned at I—I line, respectively.

Each of FIGS. 1 (1), (2) and (3) is a sketch showing a stimulable phosphor sheet 10 of the invention, a partially enlarged drawing of (1) and a partially sectioned view of (2) viewed from the I—I line, respectively. Each of the shadow portions in (2) and (3) indicates the stimulating ray-reflecting partitions 11, and the long and narrow parts sectioned with the shadow portion are the stimulable phosphor-charged areas 12. The thickness of the phosphor sheet is generally in the range of 20 μm to 1 mm, preferably 50 μm to 500 μm. Preferably, each partition has a thickness of 1 μm to 50 μm, and each stimulable phosphor-charged area 12 has a width (in planar direction) of 10 μm to 500 μm (average value).

The top and the bottom of the partitions in FIG. 1 are exposed on the surfaces of the sheet, but both or one of them may be buried in the phosphor sheet. Preferably, the height of the partition is in the range of ⅓ to ¼ of the thickness of the phosphor sheet.

FIG. 2 (1) shows another stimulable phosphor sheet of the invention in which the top of the partition is buried in the phosphor sheet. FIG. 2 (2) is a sectional view of the phosphor sheet of (1) provided with a support 13 and a protective film 14 on the bottom and the top surfaces, respectively.

In the present specification, the stimulating ray-reflecting material for the partitions means material reflecting or scattering the stimulating rays well. Exaples of the material include glass, ceramic material and plastic material (i.e., resin material). For enhancing the reflection, resin material containing a great number of light-reflecting particles such as white pigments(e.g., titanium dioxide particles, barium sulfate particles) are also employable. A thin film reflecting the stimulating rays may be provided between the partition and the phosphor-charged area, so as to further enhance the reflection.

As the stimulable phosphor incorporated in the phosphor-charged area, a phosphor giving a stimulated emission of a wavelength in the range of 300 to 500 μm when it is irradiated with stimulating rays of a wavelength in the range of 400 to 900 μm is preferably employed. In Japanese Patent Provisional Publications No. 2-193100 and No. 4-310900, some examples of the stimulable phosphor are described in detail. Examples of the preferred phosphors include divalent europium or cerium activated alkaline earth metal halide phosphors, and cerium activated oxyhalide phosphors.

The stimulable phosphor is usually used in the form of particles. The phosphor particles and a binder are well mixed in an appropriate solvent to give a coating dispersion for the phosphor sheet. In the coating dispersion, the binder and the phosphor are introduced generally at a ratio of 1:1 to 1:100 (binder:phosphor, by weight), preferably 1:8 to 1:40 (by weight). As the binder material, various known resins are employable. The coating dispersion may further contain a dye absorbing the stimulating ray.

The stimulable phosphor sheet of the invention can be produced, for example, in the following manner.

First a sheet of stimulating ray-reflecting material is placed and fixed on a support with an adhesive to prepare a stimulating ray-reflecting layer. On the stimulating ray-reflecting layer, a light-sensitive dry film was placed and fixed. The thus formed layered composition is then exposed to light through linear masks, and developed. The exposed parts of the sheet are etched with sandblast to prepare linear partitions made of stimulating ray-reflecting material. In Japanese Patent Provisional Publication No. 62-36599, the dry etching process usable for the invention is described. Further, other etching processes such as a LIGA process and an excimer laser cutting process are also employable.

Independently a flexible sheet is prepared from a coating dispersion comprising stimulable phosphor particles and a binder. The prepared sheet is placed on the partitions, and pressed or heated to sink into the areas among the partitions. Thus, a stimulable phosphor sheet is produced. The pressed flexible sheet may be peeled off, and the formed gaps may be charged with the stimulating ray-reflecting material. Further, the areas among the partitions may be filled with the coating dispersion to produce the stimulable phosphor sheet. Otherwise, the areas among the partitions may be filled with a stimulable phosphor, and then the firing procedure may be performed to produce the stimulable phosphor sheet. The stimulable phosphor sheet can be also produced by depositing a stimulable phosphor on the areas among the partitions.

On one surface of the stimulable phosphor sheet of the invention, a layer for reflecting the stimulating rays and/or the stimulated emission may be provided. The light-reflecting layer enhances the sensitivity of the phosphor sheet of the invention. The light-reflecting layer can comprise white pigments (e.g., titanium dioxide particles, barium sulfate particles) or non-stimulable phosphor particles (which exhibit no stimulated emission) dispersed in a binder. If the phosphor sheet has a support, the light-reflecting layer is usually provided between the phosphor layer and the support. In place of the light-reflecting layer, a light-absorbing layer may be provided between the phosphor layer and the support since it generally improves the sharpness.

On the surface not facing the support, the phosphor sheet preferably has a protective film. In order not to affect the simulating ray or the stimulated emission, the film is preferably transparent. Further, for protecting the phosphor sheet from chemical deterioration and physical shock, the film should be chemically stable and physically strong.

The protective film can be provided by fixing a separately prepared plastic film on the phosphor sheet with adhesion, or by coating the phosphor sheet with a solution of protective film material and drying the applied solution. In the protective film, fine particle filler may be incorporated so as to reduce blotches caused by interference and to improve the quality of the resultant image. Examples of preferable material for forming the transparent plastic film include polyester resins (e.g., polyethylene terephthalate, polyethylene naphthalate), cellulose derivatives (e.g., cellulose triacetate), and other various resin materials such as polyolefin and polyamide. The thickness of the protective film is generally in the range of not more than 30 μm, preferably 1 to 15 μm, more preferably 5 to 12 μm.

For enhancing the resistance to stain, a fluororesin layer is preferably provided on the protective film. The fluororesin layer can be formed by coating the surface of the protective film with a solution dissolving (or dispersing) a fluororesin in an organic solvent, and drying the applied solution. The fluororesin ray be used singly, but in usual a mixture of the fluororesin and a film-forming resin is employed. In the mixture, an oligomer having polysiloxane structure or perfluoroalkyl group can be further added. The coating can be performed by known coating means such as doctor blade, roll coater, and knife coater. In the fluororesin layer, fine particle filler may be incorporated so as to reduce blotches caused by interference and to improve the quality of the resultant image. The thickness of the fluororesin layer is generally in the range of 0.5 to 20 μm, preferably 1 to 5 μm. In forming the fluororesin layer, additives such as crosslinking agent, film-hardening agent and anti-yellowing agent can be used. In particular, the crosslinking agent advantageously improves durability of the fluororesin layer.

The aforementioned stimulable phosphor sheet is favorably employed in the process of the invention for reproducing a radiation image from a stimulable phosphor sheet. The process is below described by referring to the attached drawings.

Figure 3:
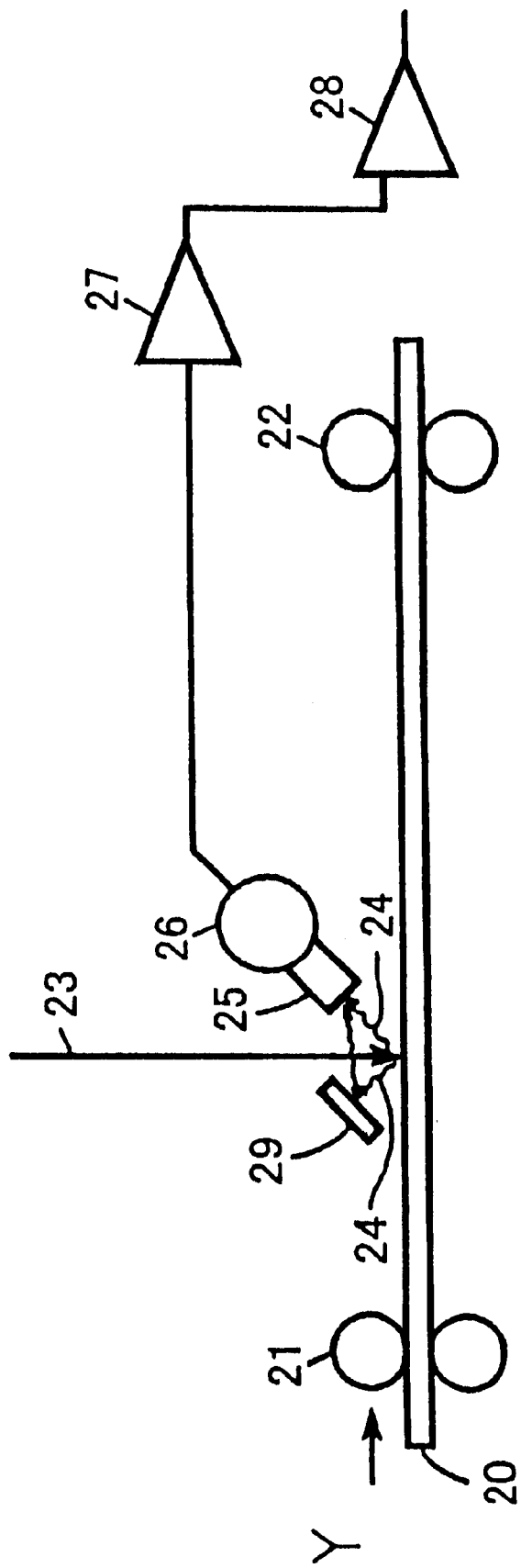
FIG. 3 is a schematic sectional view of an image-reading system performing the process of the invention.
Figure 4:
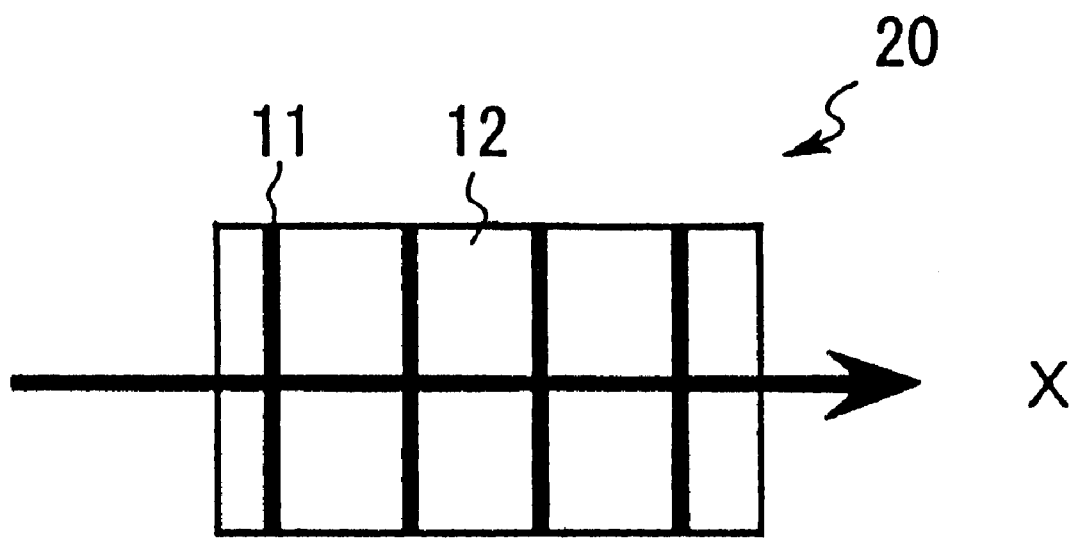
FIG. 4 is a schematic view illustrating the relation between the directions of the sheet and the stimulating ray in the reading system.

FIG. 3 is a schematic sectional view of an imagereading system performing the process of the invention. FIG. 4 is a schematic view illustrating the relation between the directions of the sheet and the stimulating ray. The stimulable phosphor sheet 20 in FIG. 3 is provided vide with the support 13 and the protective film 14 on the bottom and the top surfaces, respectively (as shown in FIG.2), and stores a radiation image of an object as a latent image by absorbing radiation (such as X-rays), for example, having passed through the object. The phosphor sheet 20 is moved by the transferring means 21 and 22 (two sets of nip-rollers) in the direction of the arrow Y. The stimulating rays (e.g., a laser beam) 23 are scanned on the top surface of the sheet 20. In this step, the stimilating rays are scanned across the partitions 11 (namely, in the direction of arrow X). The angle of the direction of the scanning to the partitions preferably is at 90°±45° (particularly preferably at approx. 90°). Further preferably, the stimulating rays are scanned approximately perpendicularly to the transferring direction of the phosphor sheet (namely, perpendicularly to the direction of arrow Y). Consequently, the transferring direction of the phosphor sheet (namely, the direction of arrow Y) is preferably parallel to the partitions.

The stimulable phosphor sheet 20 emits the stimulated emission 23 from the spot where the stimulating rays 24 are applied. The stimulated emission 23, which indicates the stored radiation energy level (which tells the radiation image information of the stored latent image), is collected directly or via the mirror 29 with the light-collecting guide 25 placed above, and converted into electric signals in the photoelectric converter (photonultiplier) 26 attached to the guide 25. The electric signals are amplified with the amplifier 27, and sent to the processing unit 28. The stimulable phosphor-charged areas 12 of the sheet 20 are beforehand sectioned, according to the pixel size, by the stimulating ray-reflecting partitions 11. Therefore, the electric signals assigned to the pixels can be sequentially obtained in the converter 26.

The stimulable phosphor sheet 20 is then advanced in a pitch corresponding to one scan of the stimulating ray, so that the area next to the measured area can be exposed to the stimulating rays. After the phosphor sheet 20 is thus transferred in the direction of arrow Y by means of nip-rollers 21 and 22, the aforementioned procedure is repeated. The radiation image information recorded on the phosphor sheet 20 is thus read by repeating the procedure until the whole surface of the phosphor sheet 20 is exposed to the stimulating rays.

In the processing unit 28, the electric signals sent from the amplifier 27 are processed according to a predetemined operations (e.g., addition, subtraction) based on characteristics of the stimulable phosphor sheet and the target radiation image. The processed signals are sent out as image signals.

From the image signals, a visible image is obtained by an image-reproducing device (not shown in the drawings). The image-reproducing device may be a display (e.g., CRT) or a machine for recording on a-light-sensitive film. In place of the image-reproducing device, the image signals may be sent to a device for recording in optical discs or magnetic discs as image files.

In the phosphor sheet 20 of the invention, each phosphor-charged area 12 need not have the width exactly corresponding to the pixel size. Even if the width does not exactly correspond to the pixel size, the image signals corresponding to the pixels can be obtained by proper operations in the processing unit 28.

For applying the stimulating rays 23, linear irradiation may be used in place of scanning a laser beam. The linear irradiation can be produced, for example, by a combination of a fluorescent lamp and an appropriate optical system.

The light-collecting guide 25 and the photoelectric converter 26 may be placed under the phosphor sheet 20 so that the stimulated emission 23 can be collected from the opposite side to the stimulating ray 23. Further, the stimulated emission 23 may be collected from both sides of the stimulable phosphor sheet 20.

What is claimed is:

1. A process for reproducing a radiation image, which comprises the steps of:

scanning stimulating rays on a stimulable phosphor sheet in which a radiation image is recorded in the form of a latent image, the phosphor sheet comprising one-dimensionally extended partitions which comprise stimulating ray-reflecting material and which divide a plane of the phosphor sheet to give plural narrow sections, and a stimulable phosphor placed separately in the narrow sections, in such manner that the stimulating rays are scanned in a direction crossing the partitions, so that the stimulable phosphor produces emission;

successively detecting photoelectrically the emission, so as to obtain a series of electric signals corresponding to the latent radiation image; and reproducing the radiation image from the electric signals.

2. The process of claim 1, wherein the stimulating rays comprise a laser beam that is scanned in a direction at an angle of 90°±45° to a direction parallel to the partitions.

3. The process of claim 1, wherein the stimulating rays are scanned, while the stimulable phosphor sheet is moved in a direction approximately parallel to the partitions.

4. A stimulable phosphor sheet comprising one-dimensionally extended partition which comprise stimulating ray-reflecting material and which divide a plane of the phosphor sheet to give plural narrow sections, and a stimulable phosphor placed separately in the narrow sections.

5. The stimulable phosphor sheet of claim 4; wherein the stimulating ray-reflecting partition has a thickness of 1 to 50 μm.

6. The stimulable phosphor sheet of claim 4, wherein the narrow sections in which a stimulable phosphor is placed has a width of 10 to 500 μm.

7. The stimulable phosphor sheet of claim 4, wherein the partitions are made of glass, ceramic material, or plastic material.

* * * * *